Sept. 2, 1924.
A. L. RUTHVEN
1,507,430
SIMPLEX TRAIN CONTROL
Filed Sept. 6, 1921
3 Sheets-Sheet 1
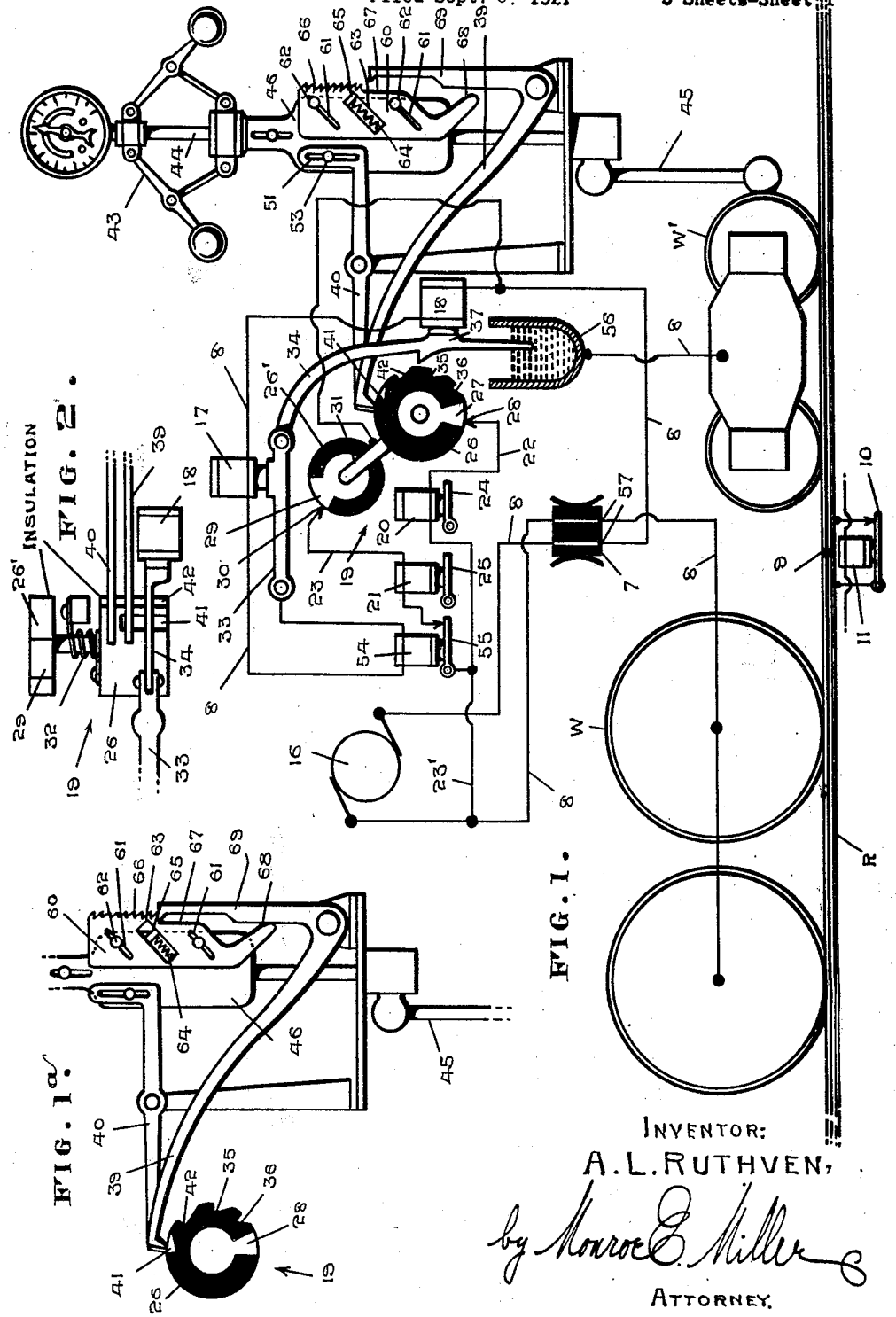
INVENTOR:
A. L. RUTHVEN,
by Monroe E. Miller
ATTORNEY.

Sept. 2, 1924.
A. L. RUTHVEN
1,507,430
SIMPLEX TRAIN CONTROL
Filed Sept. 6, 1921    3 Sheets-Sheet 2
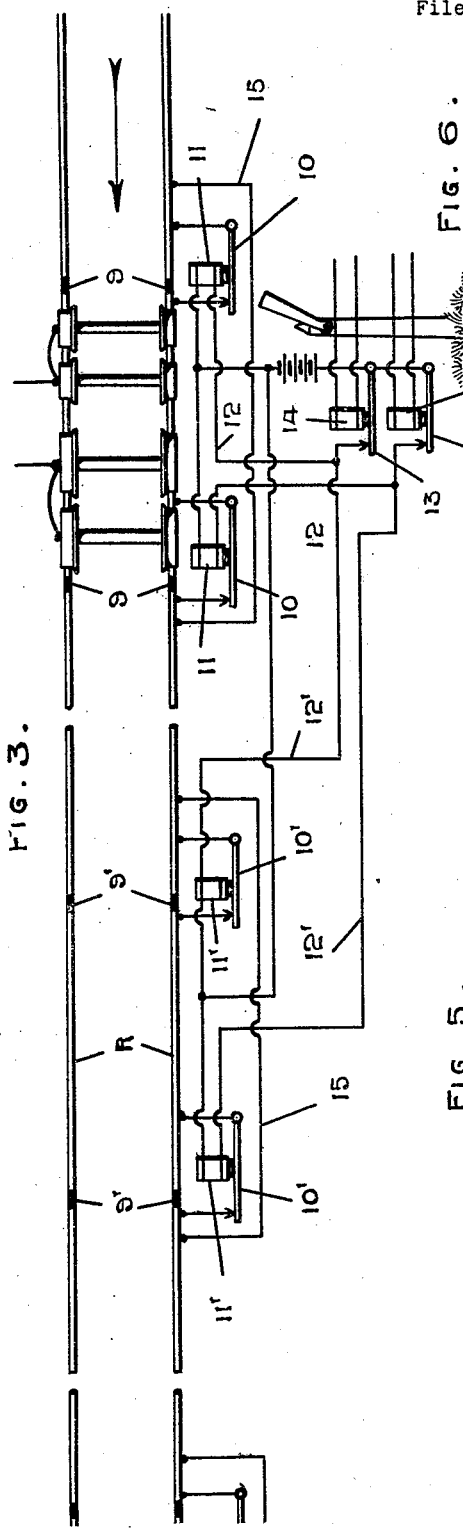
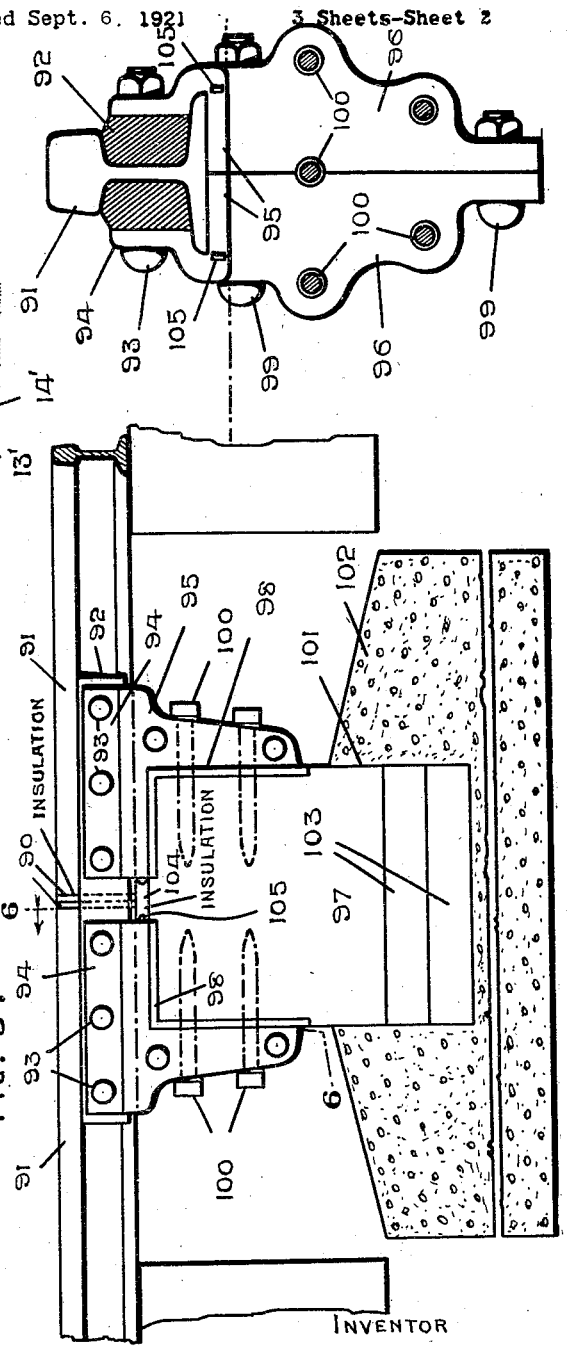
INVENTOR
A. L. RUTHVEN
by Monroe L. Miller
ATTORNEY

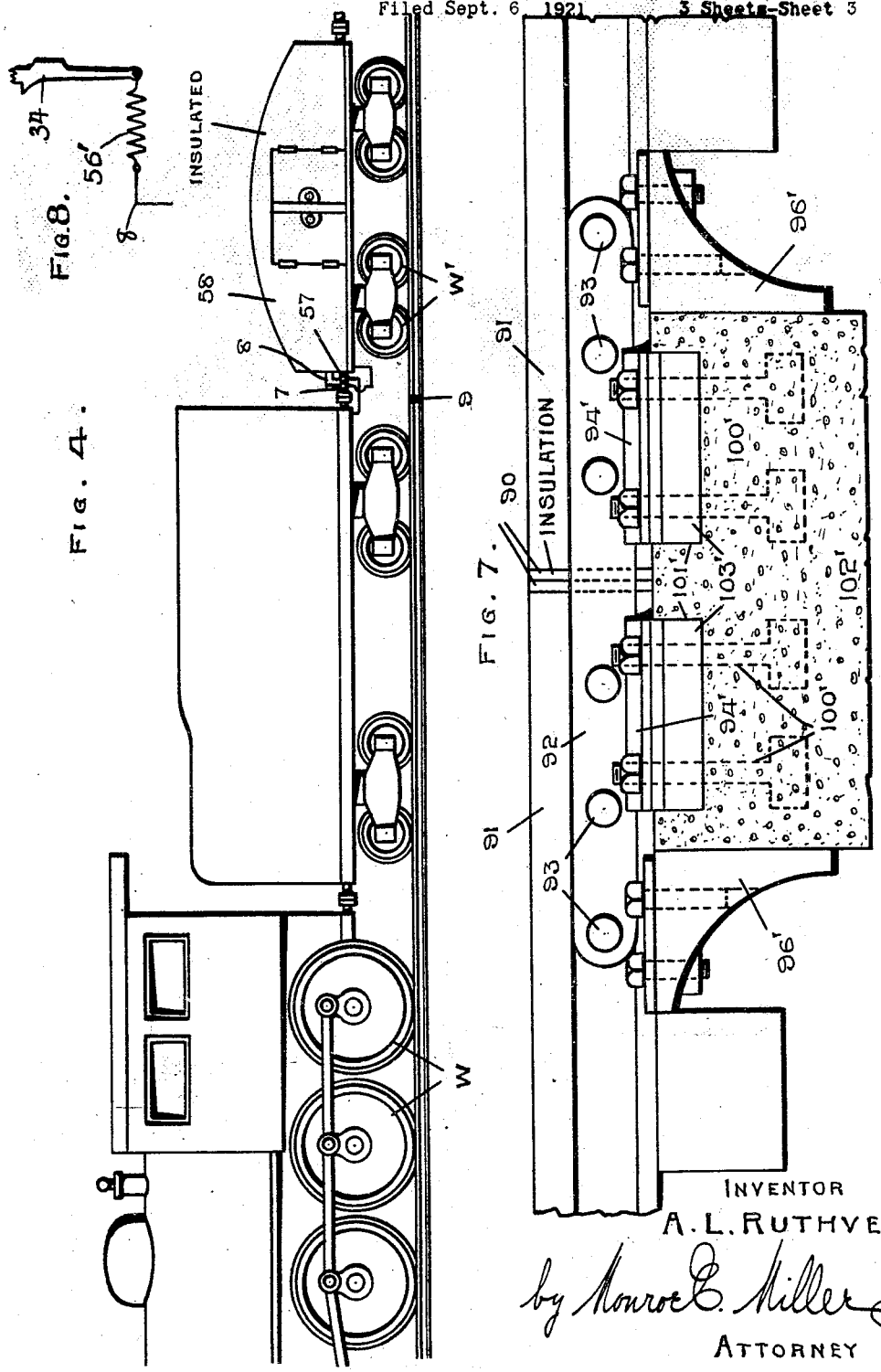

Patented Sept. 2, 1924.

1,507,430

UNITED STATES PATENT OFFICE.

ALFRED L. RUTHVEN, OF ROCHESTER, NEW YORK.

SIMPLEX TRAIN CONTROL.

Application filed September 6, 1921. Serial No. 498,609.

*To all whom it may concern:*

Be it known that I, ALFRED L. RUTHVEN, citizen of the United States, residing at Rochester, in the county of Monroe and State of New York, have invented certain new and useful Improvements in Simplex Train Controls, of which the following is a specification, reference being had therein to the accompanying drawing.

The present invention relates to train controlling apparatus, and is more particularly an improvement over the apparatus disclosed in my copending application filed January 14, 1921, Serial No. 437,288.

The primary object of the invention is the utilization of insulation in the rails in such a way and in such an arrangement that the vehicle circuit of the electrical equipment is controlled for producing such vehicle-controlling conditions as predetermined, without the necessity of using complicated cooperating devices between the vehicle and track, such as ramps, trips, induction magnets, and similar obstructions on the vehicle or track, so as to reduce the cooperating devices between the vehicle and track to a primarily simple construction, which will nevertheless be thoroughly efficient, practical and dependable.

Another object is the provision of a vehicle equipment for controlling one or more devices, for indicating or signalling caution and danger conditions, or for controlling the train for such conditions, or the like, as may be desired according to any previously-selected arrangement, and controlled by the simple closing and opening of the vehicle circuit, the arrangement being such that danger indications or conditions will be produced should the electrical current for either the track or vehicle equipment fail, thus providing for a reliable and certain stopping of the vehicle should the equipment fail to function as intended, as well as providing for the efficient and unerring control of the vehicle according to the track conditions, in order that the vehicle will be stopped or given a danger signal or condition should the apparatus become defective or should the vehicle equipment fail to respond to the track conditions as intended, and additional precautionary means being provided as over the apparatus disclosed in said application.

A further object is the provision of a vehicle equipment having novel means to be operated step by step or with progressive action to produce different desired signals or conditions in succession as the vehicle moves along the track, and thus enable various conditions to be indicated on the vehicle or the vehicle controlled accordingly. In this manner, as the vehicle proceeds, which may be in either direction if the apparatus is so intended, a caution signal or condition can be produced on the vehicle, and, if desired, a danger signal or condition can then be produced after such caution indication or condition, or a series of successive signals or conditions can be provided for, to operate step by step or in progressive succession in order to develop a proper caution and then danger condition or control of the vehicle. An additional object, in this connection, is to improve the step by step device as compared with the similar device disclosed in said application, to increase the efficiency.

A still further object is the control of such vehicle equipment according to the speed of the vehicle under caution and danger conditions, whereby normal conditions can only be restored for the continued movement of the vehicle when the predetermined conditions are complied with, such as after the slowing down of the vehicle below a predetermined speed following a caution signal or condition, or the bringing of the vehicle to a stop after a danger indication or condition, thereby requiring either the retarding or slowing up of the vehicle under caution conditions to enable the vehicle to proceed or the stopping of the vehicle under danger conditions before it can resume its movement, and means being provided for assuring of caution and danger indications or conditions even though the vehicle may be travelling at a slow or caution speed when passing the controlling point or station.

The invention has for another object the provision of a special car for carrying the equipment, which can be suitably insulated, for connection behind the locomotive and tender, to afford convenient means for placing the equipment in a train of cars, without expensive alterations to the locomotive or tender. The special cars can thus be readily coupled in the trains, to enable the trains to be controlled by the present apparatus, instead of altering the locomotives or tenders, which might involve difficulties or prohibitive expense, and such special cars can be used on old locomotives and tenders, until the new ones are built with the equipment as a part thereof after the adoption of the controlling apparatus. The special cars will thus serve as a convenient temporary expedient for including the controlling equipment in trains until the equipment is embodied as a part of the locomotives and tenders.

Still another object is to provide a novel and improved insulated joint for the traffic rails, for the purposes of the present invention, in order to obtain insulation which will not break down, as well as efficiently supporting the rail ends and preventing the rail sections from creeping.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein—

Figure 1 is a diagrammatical view of the vehicle or train equipment. Fig. 1ᵃ is a side elevation of the ratchet device in another position.

Fig. 2 is a plan view of the ratchet device of such equipment.

Fig. 3 is a diagrammatical view of the track part of the apparatus, showing the insulation for the rails and simple track circuits.

Fig. 4 is a side elevation of the special car or vehicle to be coupled behind the locomotive and tender for incorporating the equipment in a train.

Fig. 5 is a side elevation showing the improved insulated rail joint.

Fig. 6 is an enlarged section on the line 6—6 of Fig. 5.

Fig. 7 is a side elevation of a modified form of insulated rail joint.

Fig. 8 is a detail view of a modification in the ratchet device.

The track part of the apparatus employs the traffic rails R, although special control rails or conducting means can be used if desired, but such special rails are unnecessary inasmuch as the traffic rails will suffice in most instances. As shown, the two pairs of wheels W and W' travel on the rails R, and these wheels may be the wheels of two separate trucks of the locomotive, tender or one or more cars. As shown, the wheels W belong to the locomotive, (reference being had to Fig. 4) while the wheels W' are those of a special car or truck. The two pairs or sets of wheels are insulated from one another, as at 7, and such insulation may be at any suitable point. A vehicle control circuit 8 has its terminals connected to the two sets of wheels so that said circuit will be normally closed whenever either or both of the rails R are electrically continuous between the wheels W and W' at the corresponding side or sides.

The circuit 8 is opened or broken by the provision of insulating points 9 in both rails R arranged in pairs whereby the vehicle or train in passing over a control point will bring the wheels W and W' at opposite sides of or astride the insulating points 9 of one pair, thereby breaking or opening the circuit 8 through both rails R between the wheels at the opposite sides. Any suitable number of pairs of insulating points 9 in the rails R can be provided in series or at suitably-spaced intervals at a control station or portion of the track, whereby the train or vehicle in moving along the track and passing over the insulating points 9 in succession, will break the circuit 8 one or more times, according to the conditions. The pairs of insulating points 9 are spaced apart farther than the wheels W and W', whereby the circuit 8 is closed when the wheels W and W' are travelling between two pairs of insulating points 9, whereas the circuit is opened or broken when the two sets of wheels pass over either pair of insulating points, thus successively breaking and closing the circuit, unless one rail R is electrically connected or bridged across the insulating point or points 9. The insulating points 9 are located at the entrance of a protected block, and, as shown in Fig. 3, there are two pairs of such insulating points at the entrance of the block, and a similar set of insulating points 9' can be located between the ends of the block, for repeating the control as the vehicle is passing through the block.

In order to control the vehicle equipment from the track, under traffic or other conditions, one insulating point 9 of each pair is bridged by a suitable switch 10, and the secondary insulating points 9' are similarly bridged by switches 10', so that when the switches are closed, they will connect the sections of the corresponding rail R across the insulations, to make the rail electrically continuous so that the wheels W and W' at one side are in electrical connection, even though the wheels may be over an insulating point. This will maintain the circuit 8 closed, unless the corresponding switch 10 or 10' is opened, thereby breaking said circuit. The opening and closing of the switch 10 or 10', therefore, will result in the circuit 8 being either opened or maintained closed when the wheels pass over the insulating points 9 or 9' of the rails. The switches 10 and 10' of the several insulated points of the track can be operated by any suitable means. As shown, electromagnets 11 are employed for holding the switches 10 closed, and similar electromagnets 11' for holding the switches 10' closed, whereby such switches will open automatically if the magnets are deenergized, either intentionally or by the accidental failure of the track equipment, thereby providing a positive breaking or opening of the circuit 8 when the wheels pass over the insulating points 9. As shown, the magnets 11 are disposed in circuits 12 including the respective controlling switches 13 and 13' under the control of electromagnets 14 and 14' of a semaphore, and the magnets 11' are connected in circuits 12' with the switches 13 and 13'' parallel with the corresponding magnets 11. The switches 10' are therefore controlled the same as the switches 10, for repeating the control conditions in the block.

If it is desired that one or both rails be used as a part of a signal circuit, each set of insulating points 9 and 9' is bridged by a conductor 15 having its terminals connected to the corresponding rail R beyond the insulating points, whereby electrical current can flow through the conductors 15 past the insulating points, without in any way interfering with the operation of the apparatus and without the insulations interfering with the circuit of which the conductors 15 and rail may form a part.

Coming to the vehicle equipment of which the circuit 8 and contact wheels or members W and W' are a part, such circuit is energized by an electrical generator 16 or other source of electrical current, thereby energizing, when the circuit is closed, the electromagnets 17 and 18 of a responsive ratchet device 19 for producing different controlling signals or conditions in the vehicle. The magnets 17 and 18 are disposed in the vehicle circuit 8, and the device 19 is operable for producing caution and danger signals or conditions, and such other signals or conditions as may be desired. As shown, said device controls a caution electromagnet or device 20 and a danger electromagnet or device 21. The magnets 20 and 21 are disposed in the respective conductors 22 and 23. These magnets 20 and 21 can operate suitable signal members or controlling devices, such as disclosed in my pending applications Serial Nos. 215,300 and 257,336 filed February 4, 1918 and October 8, 1918, respectively, although any suitable signalling or controlling devices can be controlled by the device 19. For purpose of illustration, pivoted armatures 24 and 25 for the magnets 20 and 21 are provided, which are normally attracted to said magnets, when they are energized, and when the magnets are deenergized said armatures will swing or drop to give caution and danger signals or to produce corresponding conditions, respectively.

The ratchet device 19 is responsive to track conditions for controlling the vehicle equipment accordingly, and includes a ratchet wheel or drum 26 having a segment 27 normally engaged by a contact 28 to which the conductor 22 leads. A second wheel 26' is rotatable with the wheel 26 and has a segment 29 normally engaged by a contact 30 to which the conductor 23 leads. The arrangement is such, that when the wheels are advanced one step, the segment 27 is removed from the contact 28, thereby opening the circuit through the magnet 20 whereas the segment 29 still engages the contact 30, but when the wheels are advanced another step, the segment 29 is also removed from the contact 30, thereby also opening the circuit of the magnet 21. In this manner, the signalling or controlling devices are operated in succession for producing a caution signal or condition first and then a danger signal or condition, so that a series of signals or conditions are obtained in progressive succession, as the device 19 is advanced or moved step by step.

The ratchet wheel 26 and secondary wheel 26' are mounted for rotation on a shaft 31, and a suitable spring 32 or other means serves to turn the wheels 26 to original or initial position when the wheel 26 is released to automatically restore the caution and danger signalling or controlling devices by closing the circuits of the magnets 20 and 21. The shaft 31 to which the segments 27 and 29 are electrically connected, is connected by a conductor 22' with the circuit 8 between the magnet 18 and generator 16, and the magnets 20 and 21 are connected by the conductor 23' with the circuit 8 so that the magnets 20 and 21 receive current from the generator without being effected by the breaking of the circuit 8 between the wheels W and W'.

The electromagnet 17 in the main vehicle circuit 8 serves the purpose of advancing the wheel 26 step by step as the circuit 8 is opened and closed in succession. Thus, an armature lever 33 is attracted by said magnet 17 and when it is deenergized said lever drops. A gravity pawl 34 is pivoted to the lever 33 to swing by gravity against the wheel 26, and said wheel has the notches or teeth 35 and 36 for the successive engagement of said pawl. The pawl 34 carries an armature 37 under the influence of the electromagnet 18, which magnet 18 serves to release the pawl 34 from the ratchet wheel 26 when the wheel has been advanced a step. The pawl swings by gravity against the wheel 26 when the magnet 18 is deenergized. Normally, the armature lever 33 is attracted by the magnet 17 and the pawl 34 attracted by the magnet 18, when the circuit 8 is normally closed, and when the circuit is broken either intentionally or accidentally, or should the current fail, the magnets 17 and 18 are deenergized, thereby releasing both the lever 33 and its pawl 34. Such lever will drop and the pawl engage the notch or tooth 35, and when the circuit 8 is again closed, the lever 33 is attracted by the magnet 17 thereby turning the wheel 26 one step, and when the step is completed, the pawl 34 moving with the lever 33 will bring the armature 37 thereof in close proximity with the pole of the magnet 18, so that said pawl is attracted to the magnet 18 and disengaged from the wheel 26, thereby providing for the advance of the wheel 26 and the releasing of the pawl 34 with one operation.

Means is provided for holding the wheel 26 when advanced one or more steps, so as to maintain the signalling or controlling conditions dependent on those conditions, and, for this purpose, a pair of catches or detents 39 and 40 are pivotally mounted to bear against the periphery of the wheel 26, and said wheel has a notch or tooth 41 for the engagement of the catch 39 when said wheel is advanced one step as above described. The wheel 26 has a second notch or tooth 42 for the engagement of the catch 40 when the wheel is advanced a second step, should the circuit 8 be broken or opened the second time, resulting in the repetition of the operation of the lever 33 and its pawl 34, during which the pawl 34 will engage the second notch or tooth 36 to advance the wheel 26 the second step.

The restoration to normal conditions is controlled by the speed or motion of the vehicle, thereby requiring certain conditions as to the movement of the vehicle to be complied with before normal conditions are restored. For this purpose, a governor 43 is provided, being operated according to the speed of the vehicle, and said governor is mounted on a shaft 44 which is operatively connected, by any suitable means, as at 45, with one of the wheels of the vehicle. Said governor has a member or plate 46 slid up and down by the governor when the speed of the vehicle is increased and decreased, respectively. A pin or stud 53 is carried by the member 46, and enters a slot 51 in the catch 40. Said slot permits the catch 40 to drop or swing into the notch 42, and the slot is of such a length that when the vehicle is brought to a stop, the pin or lug 53 will contact at the lower end of the slot 51 to raise the catch 40 and disengage it from the wheel 26. In this manner, the detent device or catch 40, which maintains the device 19 in advanced signalling or controlling position, is controlled by the governor 43 according to the movement of the vehicle, said catch 40 being released when the vehicle speed is reduced to a standstill.

The apparatus as described to this point, is substantially the same as disclosed in the application, Serial No. 437,288, with slight variations. A safety device is provided for opening the circuit 8 should the magnet 17 fail to be reenergized after the opening of the circuit 8 and reclosing of said circuit between the wheels W and W'. For this purpose, an electromagnet 54 is disposed in the circuit 8 in series with the magnets 17 and 18, and normally closes a switch 55 between the magnet 21 and conductor 23', and the magnet 54 is a slow acting one, so that the switch 55 will only be released after an interval of time. Accordingly, if the magnet 17 is deenergized by the opening of the circuit 8 and the circuit is again closed, the switch 55 is held closed during the interval. However, should the magnet 17 become dead and fail to raise the lever 33 so as to turn the ratchet device 19, then after an interval of time sufficient for the magnet 17 to act, the magnet 54 will become dead, thereby releasing the switch 55 and opening the circuit of the magnet 21 to give a danger signal, thereby avoiding the possibility of proceeding with the apparatus out of commission. The magnet 54 will only act if the magnet 17 is not reenergized in the required length of time after being deenergized.

Another precautionary arrangement is the fact that the armature lever 33 and its pawl 34 are a part of the circuit 8, being connected in series with the magnets 17, 18 and 54, and the free terminal of the pawl 34 dips in a cup 56 of mercury or other conducting liquid to close the circuit through said pawl without interfering with the movement of said pawl. Should the lever 33 of pawl 34 be removed, either accidentally or intentionally, this would immediately open the circuit 8 and produce danger conditions.

A tell-tale arrangement of the circuit 8 in connection with the insulations 7 is used, whereby the breaking down of said insulation, will result in the apparatus giving a danger signal or condition. Thus, the circuit 8 includes plates 57 embedded in the insulation 7 between the cars, trucks or other bodies including the wheels W and W', and said plates are so arranged that a short circuit between the plates or between either plate and the corresponding wheels W or W', will cut off the current from the magnets, thereby letting the equipment go to danger. Thus, the plate 57 of the terminal of the circuit 8 which extends to the wheels W is disposed nearest to the car or truck having the wheels W', and the other plate 57 is disposed nearest to the car or truck having the wheels W, so that a short circuit will assure of a connection between the conductors of the circuit 8 between the generator 16 and the magnets, so that the magnets will be deenergized. In this manner, should the insulation break down, the apparatus will go to danger.

The vehicle equipment, during the course of transition when adopting the train control, is carried within a special car or truck 58 mounted on the wheels W and W', and such car can be insulated, as at 7, where it is coupled to the tender. The car is also preferably insulated on the exterior, to avoid possible short circuits between such car and the tender or locomotive. By installing the vehicle equipment in such a special car, the car can be readily coupled behind the tender, to include the equipment in a train without the necessity of altering the locomotive or tender, and these special cars can be readily inserted in the trains and removed therefrom, thus rendering the vehicle equipments portable units to be used and transferred as necessary. These special cars can be used in trains until the locomotives or tenders are either altered or built with the equipment installed therein. In other words, during the course of transition in installing the equipment in locomotives and tenders, the special cars can be used, by simply coupling them behind the tender or other car of each train.

The catch 39 remains engaged with the wheel 26, and means is provided whereby said catch is only released from said wheel when the vehicle slows down its speed when travelling at caution speed, or below a predetermined speed of say fifteen miles per hour. In other words, such means requires that the vehicle travel below fifteen miles per hour and reduce its speed a predetermined amount, in order to release the catch 39 from the wheel 26.

Such means includes a plate or member 60 carried by the member 46 for movement with said member and also relatively to said member 46. The plate 60 has inclined cam slots 61 receiving studs or pins 62 carried by the member 46, and the plate has an inclined slot 63 in which a spring 64 is disposed, said spring bearing against the plate 60 at the lower end of the slot and against a lug 65 carried by the member 46 and located within said slot, so that said spring normally moves the plate 60 inwardly and downwardly to bear against the studs 62 at the upper ends of the slots 61, as seen in Fig. 1, although other means than the spring 64 can be used for moving the plate 60 to such normal position. The outer edge of the plate 60 has a vertical series of ratchet teeth 66, and a smooth portion 67 below said ratchet teeth, with a tripping finger 68 below said smooth portion 67. The catch 39 has an upstanding dog 69 to engage the teeth 66 when the catch 39 moves into the notch 41. The arrangement is such, that when the catch 39 bears on the wheel 26, the dog 69 is moved away from the path of movement of the teeth 66, so that the plate 60 can move upwardly and downwardly with the governor member 46 without interference. When the vehicle is travelling above caution speed or fifteen miles per hour, the teeth 66 are moved above the upper end of the dog 69, and when the vehicle is travelling below such speed, the teeth 66 are opposite to the end of the dog. Consequently, if the vehicle is travelling below fifteen miles per hour, and the wheel 26 is turned so that the catch 39 drops into the notch 41, the dog 69 is thereby moved into engagement with one of the teeth 66, and if the vehicle is travelling above such speed, the dog 69 moves against the smooth portion 67, to be engaged by the lowermost tooth when the plate 60 is moved downwardly with the governor. In this manner, when the catch 39 drops into the notch 41, the dog 69 will stop the downward movement of the plate 60 during the slowing down of the vehicle and downward movement of the member 46 of the governor, such downward movement of the plate 60 only being stopped when travelling at fifteen miles per hour or slower. The further reduction in speed will result in the member 46 being moved downwardly relatively to the plate 60, inasmuch as said plate is stopped in its downward movement, as seen in Fig. 1ª, and the studs 62 moving with the member 46 will, by cam action in the slots 61, force the plate 60 outwardly, as seen in Fig. 1ª, thereby swinging the dog 69 and raising the catch 39 out of the notch 41 to release the wheel 26. Such wheel can therefore return to normal position under the action of the spring 32. The outward movement of the plate 60 will also bring the tripping finger 68 against the dog 69, so that after said dog is swung to raise the catch 39 out of the notch 41 to release the wheel 26, the catch will then be released, inasmuch as the further outward movement of the plate 60 will cause the finger 68 to swing the dog 69 out of engagement with the teeth 66. This will release the plate 60 and the spring 63 will move said plate inwardly and downwardly to normal position, and the catch 39 can then again drop against the wheel 26, to engage in the notch 41 if the wheel 26 is again turned by a caution signal or indication. By eliminating the finger 68, the catch 39 will be retained in releasing position until the vehicle again speeds up so as to raise the member 46, whereby the upward movement of the studs 62 in the slots 61, will retract the plate 60 and release the dog 69 and catch 39. The use of the finger 68 is, therefore, optional. If it is desired that the catch 39 be released after the release of the wheel 26 therefrom, then the finger 68 is used, but if it is preferred that the catch 39 be held disengaged from the wheel 26 until the vehicle increases its speed or the catch 39 is manually released, the finger 68 is omitted.

The operation of the apparatus is as follows: In clear conditions, the switches 10 and 10' are closed, thereby bridging the insulations 9 and 9', so that the circuit 8 will remain closed, and the vehicle equipment will therefore be maintained in clear condition unless there is a failure of current, a short circuit, or the like, which will result in a danger or caution signal. Should the semaphore or other control station be set for caution, the magnet 14 will release the switch 13 thereby opening the circuit of one magnet 11 and one magnet 11', so that the corresponding switches 10 and 10' are opened. Consequently, if the vehicle passes the insulating point 9 which is not bridged, the circuit 8 will be opened, thereby deenergizing the magnets 17 and 18 and the lever 33 and pawl 34 will drop. When the vehicle has moved past such insulating point, the circuit 8 is again closed, thereby energizing the magnets 17 and 18, and the lever 33 being raised by the magnet 17 will turn the wheel 26 one step, and the pawl 34 is then removed from the wheel by the magnet 18. The catch 39 will drop into the notch 41 of the wheel 26, to retain said wheel in caution position, with the segment 27 removed from the contact 28, to open the circuit of the magnet 20, so that the armature 24 will drop to give a caution signal or controlling condition. It is then necessary for the vehicle to slow down to a speed of fifteen miles per hour or less, and to slow down a predetermined amount under such caution speed, in order to restore the device 19 by disengaging the pawl 34 from the wheel 26. If, at the time the catch 39 drops into the notch 41, the vehicle is travelling above such speed, the dog 69 will move against the smooth portion 67 of the plate 60, and when the speed is slowed down to fifteen miles per hour, the lowermost tooth of the teeth 66 will strike the dog 69, whereas if the vehicle is travelling below such speed, the dog 69 will immediately engage one of the teeth 66 when the catch 39 drops into the notch 41. In either event, with the vehicle either travelling in caution speed or slowed down to such speed, the dog 69 stops the further downward movement of the plate 60 with the member 46 and the studs 62 continuing to move down with the member 46, will, by cam action in the slots 61, move the plate 60 outwardly to swing the dog 69 and raise the catch 39 out of the notch 41, so as to release the wheel 26 after the vehicle has been slowed down a predetermined amount under caution control. The spring 32 will then return the device 19 to normal clear position. If the tripping finger 68 is used, the catch 39 will be released from the plate 60 by a continued reduction in speed after the wheel 26 is released, inasmuch as said finger in contacting with the dog 69 by the outward movement of the plate 60, will swing said dog and disengage it from the teeth 66, thereby releasing the plate 60 so that its spring 64 will move the plate to normal position with respect to the member 46, and the dog 39 can then drop against the wheel 26 to reenter the notch 41 if the wheel 26 is again turned before the vehicle increases its speed.

Under danger conditions, when both insulating points 9 have their switches 10 open, the device 19 will be set to caution position by the first breaking of the circuit 8, and the wheel 26 is held by the catch 39 when the circuit 8 is again closed to energize the magnet 17 and raise the lever 33 and pawl 34. Then when the circuit 8 is again opened by the second insulating point, the lever 33 and pawl 34 are again released from the magnets 17 and 18, and the pawl will engage in the notch 36, so that when said circuit is again closed, and the lever 33 raised, the wheel 26 will be advanced another step and the pawl or catch 40 will drop in the notch 42, thereby retaining the wheel 26 in danger position. The vehicle must then come to a stop in order to remove the catch 40 from the notch 42. If, when the vehicle has come to a stop, the catch 39 engages the wheel 26 suitable means can be provided for the manual or other authorized release of the catch 39 from the wheel 26, for clearing the device 19, in order that the vehicle can proceed to the next station for making repairs or adjustments, if the equipment is out of order, or if the dangerous conditions have been removed from the track, or the like. The ratchet device could be under lock and key so that the catch 39 could only be released by an authorized person.

It will be noted that should the magnet 17 fail to pick up the armature lever 33 for turning the wheel 26 to either position, when the circuit 8 has been broken and closed again, due to a failure of current, short circuit, or the like, the magnet 54, will after an interval, release the switch 55, thereby opening the circuit of the danger magnet 21 to give a danger signal or condition.

One of the insulated rail joints is shown, in Figs. 5 and 6, wherein the insulating plates or sheets 90 are disposed between the adjacent ends of the rail sections 91, and fish plates or bars 92 of wood or other insulating material are secured to the opposite sides of the rail webs by means of the usual bolts 93. Said fish bars are sufficiently stout to assist in holding the rail sections together in alinement. Two pairs of side plates 94 are secured by the bolts 93 to the bars 92, and the adjacent ends of said plates are spaced apart so as to be insulated from one another, with only the bars 93 extending from one rail section to the other across the insulation between the rail sections. The plates 94 have lower inturned flanges 95 to extend under the base flanges of the rail sections, and the flanges 95 of the two pairs of clamping plates have depending abutments 96 disposed at opposite sides of the tie 97 which is disposed under the joint. Angle plates 98 are preferably fitted on the tie over the upper corners thereof so that the flanges 95 and abutments bear against said plates, as seen in Fig. 5. The abutments 96 of each pair are secured together by transverse bolts 99 extending through them, and the abutments are secured to the tie 97 at the opposite sides by means of lag screws 100 extending through the abutments and into the tie. The abutments are thus firmly secured to the tie, which will fasten the rail sections down on the tie, and also prevent the creeping of the rail joint on the tie. The tie 97 is supported on a concrete sleeper or base 102 embedded in the roadbed, said sleeper or base having an upper groove or channel 101 receiving the tie, to retain the tie in place. Bars or shims 103 of wood or other suitable material are disposed in the channel 101 under the tie 97, for cushioning the tie and also supporting it at the desired height in either horizontal or inclined position according to the track. A plate 104 of insulating material is disposed under the ends of the rail sections on the tie 97 between the flanges 95, and is held in place by lugs 105 extending from the adjacent ends of said flanges and overlapping the ends of said plate 104. With this construction, there is no metal extending from one rail section to the other, and the parts 90, 92, 97 and 104 between the rail sections are all of insulating material, so that the insulation will not break down. The joint is also firmly supported and is prevented from creeping.

A modified form of insulated rail joint is shown in Fig. 7, wherein the end portions of the rail sections 91 are disposed on the concrete sleeper or base 102' which has channels or grooves 101' extending transversely under the rail sections with cushion bars or plates 103' disposed in said channels. The base flanges are clamped down on the bars 103' by means of clamps 94' engaged by bolts 100' embedded in the sleeper 102', thereby fastening the rail sections down. Abutments 96' are clamped to the rail sections and abut the opposite sides of the sleeper 102', to prevent the rail from creeping.

Fig. 8 shows a spring 56' connected to the pawl 34 to assist in pulling it against the ratchet wheel, and such spring is disposed in the circuit 8 to form a part thereof, instead of using the liquid cup. Should the spring 56' break, the circuit would be opened to give a danger indication, the same as if the pawl itself were broken or removed.

Having thus described the invention, what is claimed as new is:—

1. Controlling equipment for a train, and a special insulated car carrying such equipment to be included in a train and part of which forms a circuit connection with the track.

2. Controlling equipment for a train, and a special car carrying such equipment to be included in a train, and having means for insulating it from the locomotive, tender or adjacent car.

3. Controlling equipment for a train, and a special car for carrying said equipment to be coupled in a train and having an insulated coupling for connecting it in rear of a locomotive and tender or other car, such equipment including a controlling circuit including the wheels of such special car and the locomotive and tender or other car to be broken by insulation in the rails.

4. The combination with a locomotive, of a special car in rear thereof, insulation between said locomotive and car, and controlling equipment carried by said car and including a controlling circuit including the wheels of said car and locomotive for the breaking of said circuit by insulation in the rails.

5. A vehicle controlling equipment including in combination with two sets of wheels, a controlling circuit including said wheels for closing the circuit through the rails and opening the circuit by insulation in said rails, and insulation between said wheels, said circuit including plates in said insulation arranged for short-circuiting said circuit if the insulation breaks down to render said equipment dead.

6. A vehicle controlling equipment including in combination with two sets of wheels to travel on a rail, a controlling circuit including said wheels, a source of electrical current and an electrically operated device normally energized from said source of current and deenergized when said wheels are insulated apart by insulation in the rails, and insulation between said wheels, said circuit including plates in said insulation between the source of current and said device for short-circuiting said circuit, should the insulation break down, so that said device is deenergized.

7. In a vehicle controlling equipment, a controlling device, a controlling circuit including an electromagnet, an armature to be attracted by said electromagnet for setting said device, and means cooperable with said electromagnet for giving an indication if said electromagnet fails to attract said armature after a predetermined interval following the release of said armature from said electromagnet.

8. In a vehicle controlling equipment, a controlling device, a controlling circuit to be closed by a conductor along which the equipment is movable and to be opened by insulation in said conductor, an electromagnet in said circuit, an armature to be released by said electromagnet when said circuit is opened and to be attracted by said electromagnet when the circuit is again closed for setting said device, and means operable after a predetermined interval following the opening of said circuit for giving an indication if said armature is not attracted by said electromagnet during such interval.

9. In a vehicle controlling equipment, a controlling device, a controlling circuit to be closed by a conductor along which the equipment is movable, and to be opened by insulation in said conductor, an electromagnet in said circuit, an armature to be released by said electromagnet when said circuit is opened and to be attracted by said electromagnet when the circuit is again closed for setting said device, and means for giving an indication if said electromagnet is unable to attract said armature when said circuit is reclosed including a slow-acting electromagnet in said circuit operable, after a predetermined interval of time, for giving such indication if the circuit is dead.

10. In a vehicle controlling equipment, a controlling device, a controlling circuit including an electromagnet, and an armature within the influence of said electromagnet for operating said device, said armature being disposed in either position thereof in said circuit to open the circuit if the armature is removed, and means for giving an indication when said circuit becomes dead.

11. In a vehicle controlling equipment, a controlling device, a controlling circuit including an electromagnet, an armature within the influence of said electromagnet, a pawl carried by said armature to engage said device for setting said device, said armature and pawl being disposed in said circuit and the circuit including a liquid cup in which said pawl is freely movable, and means for giving an indication if said circuit becomes dead by the removal of said armature and pawl or otherwise.

12. A vehicle controlling equipment including a movable controlling device, means controlled from the track for automatically moving said device in one direction, means for controlling the movement of said device in the opposite direction, and means operable for controlling the lastnamed means below a predetermined speed of the vehicle and requiring a predetermined reduction in speed at any speed below said predetermined speed, for the operation of said lastnamed means for the movement of said device in the secondnamed direction.

13. A vehicle controlling equipment including a device adapted to be set for a predetermined condition, means controlled from the track for automatically setting said device, and means controlling the return of said device and operable for requiring a predetermined reduction in speed of the vehicle at any speed below a predetermined speed to enable said device to be returned.

14. In a vehicle controlling equipment, a device adapted to be set for a predetermined condition, means controlled from the track for automatically setting said device, means controlling the return of said device, a governor operated according to vehicle speed, and means between said governor and secondnamed means controlling said secondnamed means for the return of said device after being set, when the vehicle speed is reduced a predetermined amount at any speed below a predetermined speed.

15. In a vehicle controlling equipment, a controlling device adapted to be set for a predetermined condition, means controlled from the track for automatically setting said device, a catch for retaining said device when set to prevent the return thereof until the catch is released from said device, and means controlling said catch and requiring a predetermined reduction in speed of the vehicle at any speed below a predetermined speed to release said catch from said device.

16. In a vehicle controlling equipment, a controlling device adapted to be returned to normal position, track responsive means for automatically setting said device, a catch for retaining said device when set, a governor operated according to vehicle speed, and means between said governor and catch operable, when the catch engages said device in set position, for controlling said catch and requiring a predetermined slowing down of the vehicle at any speed below a predetermined speed to release said catch from said device.

17. In a vehicle controlling equipment, a responsive controlling device including a movable member adapted to return to normal position when released, a catch for engaging said member and holding same against return movement to normal position when said member is advanced to one position, another catch to engage said member and to hold it against return movement when said member has been moved to another position, a governor operated according to vehicle speed, means for releasing the secondnamed catch from said member when the governor becomes dead by the stopping of the vehicle, and means controlling the firstnamed catch and controlled by the governor for releasing the firstnamed catch from said member when the vehicle speed is reduced a predetermined amount at any speed below a predetermined speed with the first-named catch engaging said member to hold it in one position.

18. In a vehicle controlling equipment, a track responsive device adapted to be automatically set in one direction and to return in the opposite direction to normal position, a catch for holding said device when set, a governor, and means carried by said catch and governor arranged to be brought into cooperation when said catch is moved into engagement with said device and operable under such conditions for releasing said catch from said device when the vehicle speed is reduced a predetermined amount at any speed below a predetermined speed.

19. In a vehicle controlling equipment, a responsive device adapted to be set in one direction and to return in the opposite direction, a catch engageable with said device for holding it when set, a governor, a member movable with said governor and relatively to said governor, a dog movable with said catch, said member and dog having means to engage one another when the vehicle is travelling below a predetermined speed with said catch engaged to said device to hold it in set position and operable for disengaging the catch from said device when said member and governor are moved relatively by the engagement of said dog with said member.

20. In a vehicle controlling equipment, a responsive device adapted to be set to controlling position and to return to normal position, a catch movable into engagement with said device when in set position for holding it against return movement, a governor operated according to vehicle speed, a member movable with the governor and movable relatively to the governor when said member is stopped and the governor continues in its movement by the slowing down of the vehicle, and a dog movable with said catch, said member having teeth for the engagement of said dog when the vehicle is travelling below a predetermined speed for stopping said member so that the slowing down of the vehicle and governor moves said member, said member, dog and catch being arranged so that such movement of such member releases the catch from said device.

21. A vehicle controlling equipment according to claim 20, and including means for disengaging said member and dog when the governor is moved farther relatively to said member after the catch is disengaged from said device.

22. In a vehicle controlling equipment, a responsive device adapted to be set to controlling position and to return to normal position, a catch to engage said device for holding it in controlling position, a governor operated according to vehicle speed, a member movable with the governor, said governor and member having cooperable portions for moving said member relatively to the governor when the governor is slowed down after said member is stopped in its movement, a dog movable with said catch, said member having ratchet teeth for the engagement of said dog when the vehicle is traveling below a predetermined speed, so that said dog stops said member, with said catch engaged with said device in controlling position, said member in being moved while engaging said dog by the slowing down of the governor and vehicle swinging said dog and catch to disengage the catch from said device.

23. A vehicle controlling equipment according to claim 22, and including means between said member and dog operable for disengaging said member and dog by a further reduction in speed of the governor when said catch has been disengaged from said device.

24. In a vehicle controlling equipment, a responsive device movable to controlling position and adapted to return to normal position, a catch to engage said device for holding same in controlling position, and means controlling said catch and operable to require the slowing down of the vehicle a predetermined amount at any speed below a predetermined speed, with said catch engaging said device in controlling position, to disengage said catch from said device, and then operable to release said catch to again engage said device during the reduction in speed.

25. Controlling equipment for a train, and a special car carrying such equipment to be included in a train, such car having a cover of insulating material to protect the equipment from short circuits.

26. A vehicle controlling equipment including contact members to engage a rail or conductor, insulation between said contact members, and a controlling circuit having its terminals connected to said members, said circuit having portions in said insulation whereby the breaking down of the insulation between said contact members will short said circuit to give an indication.

27. A vehicle controlling equipment including contact members to engage a rail or conductor, insulation between said members, and a controlling circuit having its terminals connected to said contact members, said circuit including plates in series with said contact members and embedded in said insulation, the plate which corresponds with each contact member being arranged in the insulation nearest to an electrical connection with the other contact member, so that a break down of the insulation between the contact members and plates will short said circuit to give an indication.

28. In a vehicle controlling equipment, a controlling circuit including electromagnetic means and means controlled by the electromagnetic means and disposed in said circuit at all times, whereby the removal or breaking of the secondnamed means in any position thereof will open said circuit, and means for giving an indication when the circuit becomes dead.

In testimony whereof I hereunto affix my signature.

ALFRED L. RUTHVEN.